2,987,553
PREPARATION OF MONOETHYL PENTABORANE-9

Eugene J. Mezey, Columbus, and Samuel William Harris, Oxford, Ohio, assignors, by mesne assignments, to Olin Mathieson Chemical Corporation, a corporation of Virginia
No Drawing. Filed Jan. 31, 1956, Ser. No. 562,586
4 Claims. (Cl. 260—606.5)

This invention relates to the manufacture of the liquid ethylated pentaborane-9, monoethyl pentaborane-9 by passing ethylene into a slurry of pentaborane and aluminum bromide or aluminum chloride. The preparation and manner of using liquid alkylated pentaboranes is described in Altwicker, Garrett, Weilmuenster and Harris application Serial No. 497,408, filed March 28, 1955.

Pentaborane-9 may be prepared by methods which are described in the art; it is a colorless liquid which melts at −46.8° C. The boron hydrides, and pentaborane-9 in particular, because of their high heats of combustion, have been recognized as materials which are potentially of value as high energy fuels. The burning of these materials with oxygen liberates considerably more energy than the oxidation of a corresponding amount of hydrocarbon, producing very high flame temperatures. Pentaborane-9 suffers from several disadvantages: (1) it has a very disagreeable odor; (2) it has a relatively high vapor pressure; its vapor pressure being 66 mm. of mercury at 0° C. and its boiling point at atmospheric pressure being 58° C.; and (3) its vapors are highly toxic.

One of the objects of this invention is to provide a method for producing high energy liquid products less volatile and less toxic than pentaborane-9 but at the same time approaching pentaborane-9 in heat of combustion. In accordance with the present invention, it has been found that ethylene can be reacted with pentaborane-9 in the presence of aluminum bromide or aluminum chloride or a mixture thereof to form monoethyl pentaborane-9 which is a stable relatively non-volatile liquid with convenient handling characteristics.

The following examples illustrate in detail various embodiments which fall within the scope of this invention and are to be considered not limitative. In the examples, the term "moles" means gram moles unless otherwise specified.

Example I

In this example an Erlenmeyer flask of 50 ml. in volume, which was fitted with a magnetic stirring bar, was utilized as the reactor. To the reactor there was added 0.5 g. (0.003 mole) of granular aluminum chloride and the system was evacuated. In the next step 5.68 g. (0.09 mole) of pentaborane-9 was condensed into the reactor which was immersed in a Dewar flask held at −196° C. After the addition of the pentaborane-9 the reactor was allowed to warm to room temperature. The ethylene utilized in the reaction was condensed into a cold trap which was maintained at −119° C. By connecting the liquid ethylene reservoir which was held at −119° C. to the reactor, a vapor pressure of approximately 400 mm. of Hg was maintained in the reactor. During the reaction the pentaborane-9 was continuously stirred. When the stopcock between the ethylene reservoir and the reactor was closed, the pressure of the reaction mixture dropped rapidly indicating a rapid uptake of ethylene. During the reaction the ethylene pressure in the reactor varied from 300 to 400 mm. of Hg. After 7½ hours the ethylene uptake had ceased and the reaction mixture had assumed a yellow color.

The reaction mixture was then fractionated. Through a series of low temperature vacuum fractionation operations, unreacted pentaborane-9 in the amount of 3.74 g. was recovered. In a like manner 1.89 g. (0.0208 mole) of the product, monoethyl pentaborane-9, was recovered which corresponds to a yield of 68.0 percent based on the quantity of pentaborane-9 consumed. By infrared analysis the spectrum of the sample as produced was shown to be identical with that of monoethyl pentaborane-9.

Example II

In this example the same reactor, a 50 ml. Erlenmeyer flask equipped with a magnetic stirring bar, was utilized. To the reactor was added 0.5 g. (0.003 mole) of granular aluminum chloride and the system was evacuated. In the next step 5.606 g. (0.09 mole) of pentaborane-9 were condensed into the reactor which was surrounded by a cold trap maintained at −196° C. After the addition of the pentaborane-9 the system was allowed to come to room temperature. The source of olefin for the reaction was a reservoir of liquid ethylene which was maintained in a cold trap held at −119° C. When the reservoir of ethylene was connected to the reactor, a pressure of 300 mm. of Hg existed in the reactor at the start of the reaction. During the reaction the pressure of the ethylene over the reaction mixture varied from about 300 mm. of Hg to about 750 mm. of Hg. The pentaborane-9 was continuously stirred throughout the reaction period. As in the previous case, when the stop-cock was closed between the ethylene reservoir and the reactor, the pressure over the reaction mixture dropped rapidly indicating a rapid uptake of ethylene. After 15 hours ethylene uptake had ceased and the reaction mixture had assumed a yellow color. The reaction was carried out at room temperature.

The reaction mixture was then fractionated. This fractionation was carried out by means of a series of fractional condensation operations at low temperatures. There was recovered, as a result of the fractionation operation, 3.114 g. of unreacted pentaborane-9 and 2.32 g. (0.0255 mole) of monoethyl pentaborane-9. The yield of monoethyl pentaborane-9 was 64.5 percent based on the quantity of pentaborane-9 consumed. By infrared analysis it was shown that the spectrum of the product was identical with that of monoethyl pentaborane-9.

Various modifications can be made in the procedure of the specific examples to provide other embodiments which fall within the scope of our invention. Thus, in place of the aluminum chloride there can be substituted aluminum bromide. The relative amounts of the various materials introduced into the reaction zone can be varied widely, as can also the reaction temperature. The amount of aluminum halide employed will generally vary from 0.1 mole to 1.0 mole per one mole of pentaborane-9. The amount of ethylene will generally vary from about 0.5 to 4.0 moles to one mole of pentaborane-9. During the course of the reaction, the temperature of the pentaborane-9 can be varied from about 0° C. to about 100° C. At higher temperatures the aluminum halide catalyst appears to react with the pentaborane-9 resulting in an undesirable reduction in the yield of the desired product. Also, the reaction time can be varied widely but usually is from 1 to 24 hours or more.

I claim:
1. A method for the preparation of monoethyl pentaborane-9 which comprises reacting pentaborane-9 with 0.5 to 4.0 moles of ethylene per mole of pentaborane-9 at a temperature within the range from 0° to 100° C. while they are in admixture with a catalytic amount of a material selected from the group consisting of aluminum bromide and aluminum chloride.

2. The method according to claim 1 wherein said material is aluminum chloride.

3. A method for the preparation of monoethyl pentaborane-9 which comprises reacting pentaborane-9 and from 0.5 to 4.0 moles, per mole of pentaborane-9, of ethylene at a temperature within the range from 0° to 100° C. while the reactants are in admixture with from 0.1 to 1.0 mole, per mole of pentaborane-9, of a material selected from the group consisting of aluminum bromide and aluminum chloride.

4. The method according to claim 3 wherein said material is aluminum chloride.

No references cited.